United States Patent
Nishio

[11] Patent Number: 6,011,765
[45] Date of Patent: *Jan. 4, 2000

[54] RECORDING MEDIUM HAVING COPYING PROTECTION SIGNALS RECORDED IN SUPERPOSITION ON MAIN SIGNALS

[75] Inventor: Ayataka Nishio, Kanagawa, Japan

[73] Assignee: Sony Corporation, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/826,660

[22] Filed: Apr. 7, 1997

[30] Foreign Application Priority Data

Apr. 12, 1996 [JP] Japan ................................ 8-091604

[51] Int. Cl.[7] .................................................. H04N 5/76
[52] U.S. Cl. ............................. 369/59; 369/124; 369/58
[58] Field of Search ..................... 369/275.3, 59, 369/48, 47, 58, 124; 386/3, 4, 22, 94

[56] References Cited

U.S. PATENT DOCUMENTS

| | | | |
|---|---|---|---|
| 4,163,253 | 7/1979 | Morio et al. | 386/94 |
| 4,333,113 | 6/1982 | Kalinowski . | |
| 4,495,526 | 1/1985 | Baranoff-Rossine . | |
| 4,698,695 | 10/1987 | Kosaka et al. . | |
| 4,724,492 | 2/1988 | Kosaka et al. . | |
| 5,179,452 | 1/1993 | Takahashi | 386/94 |
| 5,194,965 | 3/1993 | Quan et al. | 386/94 |
| 5,218,448 | 6/1993 | Honjo et al. | 386/94 |
| 5,323,244 | 6/1994 | Yamaguchi et al. | 386/94 |
| 5,418,853 | 5/1995 | Kanota et al. | 386/94 |
| 5,537,216 | 7/1996 | Yamashita et al. | 386/94 |
| 5,627,655 | 5/1997 | Okamoto et al. | 386/94 |
| 5,673,357 | 9/1997 | Shima | 386/94 |
| 5,706,269 | 1/1998 | Ogura et al. | 369/275.3 |
| 5,712,838 | 1/1998 | Inazawa et al. | 369/58 |
| 5,719,937 | 2/1998 | Warren et al. | 386/94 |
| 5,748,594 | 5/1998 | Nihio et al. | 369/59 |

FOREIGN PATENT DOCUMENTS

| | | |
|---|---|---|
| 244215 | 4/1987 | European Pat. Off. . |
| 277019 | 1/1988 | European Pat. Off. . |
| 392612 | 4/1990 | European Pat. Off. . |
| 607714 | 3/1993 | European Pat. Off. . |
| 6-36467 | 2/1994 | Japan ........................ 386/94 |
| 2287624 | 1/1995 | United Kingdom . |

OTHER PUBLICATIONS

Patent Abstract of Japan No. 04331517.

*Primary Examiner*—Nabil Hindi
*Attorney, Agent, or Firm*—Jay H. Maioli

[57] ABSTRACT

A signal processing apparatus in which an analog signal having a first band is summed to a copying protection signal having a pre-set frequency in a second band sufficiently separated from the first band and the resulting sum signal is converted into a 1-bit digital signal which is then recorded on a recording medium. Therefore, if a user annuls the copying protection on purpose, the sum signal is converted into a multi-bit signal at the time of removing the pre-set frequency, preventing the original 1-bit signal from being copied. Thus it becomes possible to inhibit copying of the 1-bit digital signal in the high-band high-quality state proper to the 1-bit digital signal.

3 Claims, 7 Drawing Sheets

RECORDING MEDIUM HAVING COPYING PROTECTION SIGNALS RECORDED IN SUPERPOSITION ON MAIN SIGNALS

BACKGROUND OF THE INVENTION

1. Field of the Invention

This invention relates to a signal processing apparatus for processing 1-bit digital signals obtained by 1-bit sigma-delta conversion, an apparatus for recording the signals and an apparatus for reproducing the signals.

2. Description of the Related Art

The method for recording, reproducing or transmitting digital signals previously converted from analog signals heretofore has been carried out by a recording and/or reproducing apparatus having an optical disc, typified by a compact disc (CD) or a magnetic tape typified by a digital audio tape (DAT), as a recording medium, or has been used in digital broadcasting, such as satellite broadcasting.

In the above-mentioned conventional digital/audio transmission apparatus, for converting the analog audio signals into digital signals, the sampling frequency of 48 kHz or 44.1 kHz or the number of quantization bits of 16 or 20 bits, has been prescribed as formats.

In the above-mentioned conventional digital audio format, audio data is recorded or transmitted simultaneously with sub-data pertinent to the audio data. The copying protection information is recorded in a portion of the sub-data and detected on the reproducing or receiving side by way of performing copying protection.

In the above method for recording the copying protection in a portion of sub-data, these sub-data can be disregarded or re-written for releasing the copying protection. Moreover, audio data remains unaffected by the operation of releasing the copying protection of the above sub-data.

It has also been contemplated to extract part of the band of the audio signals by an acute notch filter and to detect the band extracted by the notch filter in order to perform copying protection. With this method, since the copying protection information is superimposed on and thus included in the audio data, the characteristics of the audio signals are changed by the notch filter if it is attempted to release the copying protection. Thus, even if the function of copying protection is achieved, the sound quality is affected significantly by the processing of copying protection.

SUMMARY OF THE INVENTION

It is therefore an object of the present invention to provide a signal processing apparatus, a signal recording apparatus and a signal reproducing apparatus whereby the function of copying protection can be executed effectively and the audio signals can be prevented from being deteriorated in signal quality.

In one aspect, the present invention provides a reproducing apparatus for reproducing a recording medium having recorded thereon, as a $\Sigma\Delta$ modulated 1-bit digital signal, a main signal having a first band and a copying protection signal having a pre-set frequency in a second band sufficiently separated from the first band. The apparatus includes reproducing means for reproducing a 1-bit digital signal from the recording medium, output means for outputting the 1-bit digital signal reproduced by the reproducing means, first extraction means for extracting the main signal having the first band from the 1-bit digital signal reproduced by the reproducing means, second extraction means for extracting the copying protection signal contained in the second band from the 1-bit digital signal reproduced by the reproducing means, and control means for inhibiting outputting of the 1-bit digital signal from the output means based on the copying protection signal extracted by the second extraction means.

In another aspect, the present invention provides a recording apparatus for recording, as a $\Sigma\Delta$ modulated 1-bit digital signal, a main signal having a first band and a copying protection signal having a pre-set frequency in a second band sufficiently separated from the first band. The recording apparatus includes addition means for summing the main signal and the copying protection signal together, $\Sigma\Delta$ modulation means for converting the result of addition by the addition means into a 1-bit digital signal, and recording means for recording the 1-bit digital signal from the $\Sigma\Delta$ modulation means on the recording medium.

In still another aspect, the present invention provides a transmission apparatus including addition means for summing a main signal having a first band and a copying protection signal having a pre-set frequency in a second band sufficiently separated from the first band, $\Sigma\Delta$ modulation means for converting an addition output of the addition means into a 1-bit digital signal, and transmission means for transmitting the 1-bit digital signal modulated by the $\Sigma\Delta$ modulation means.

In yet another aspect, the present invention provides recording medium having recorded thereon a 1-bit digital signal obtained by superposing a main signal having a first band and a copying protection signal having a pre-set frequency in a second band sufficiently separated from the first band and modulating the resulting superposed signal by $\Sigma\Delta$ modulation.

With the signal processing apparatus, a sum output of the main signal having the first band and the copying protection signal having a pre-set frequency in the second band sufficiently separated from the first band is converted by $\Sigma\Delta$ modulation means, thus most effectively executing the copying protection function and prohibiting deterioration of the sound quality of the audio signal.

With the recording apparatus according to the present invention, a sum output of the main signal having the first band and the copying protection signal having a pre-set frequency in a second band sufficiently separated from the first band is converted by $\Sigma\Delta$ modulation means, and the resulting 1-bit digital signal is recording-processed by recording means for recording on a recording medium. This renders it possible to superpose the copying protection signal on the main data to prevent an illicit copying-protection function releasing operation from being occasionally performed on the reproducing side. In addition, since the frequency band not affecting the audio range is used as the band in which to superpose the copying protection signal, the main audio data may be prevented from being deteriorated in sound quality.

With the reproducing apparatus according to the present invention, since the main signal and the copying protection signal are extracted by the first extraction means and the second extraction means from the 1-bit digital signal taken out from the recording medium and which is reproduced by the reproducing processing means, and control means controls the copying inhibiting operation of the 1-bit digital signal based on the copying protection signal, the 1-bit digital audio data as the main data itself is converted into multi-bit data to frustrate the attempt to illicitly release the copy protection function, thus enabling protection of the original data and effectively displaying the copying protection function.

DESCRIPTION OF THE PREFERRED EMBODIMENTS

Figure 1:
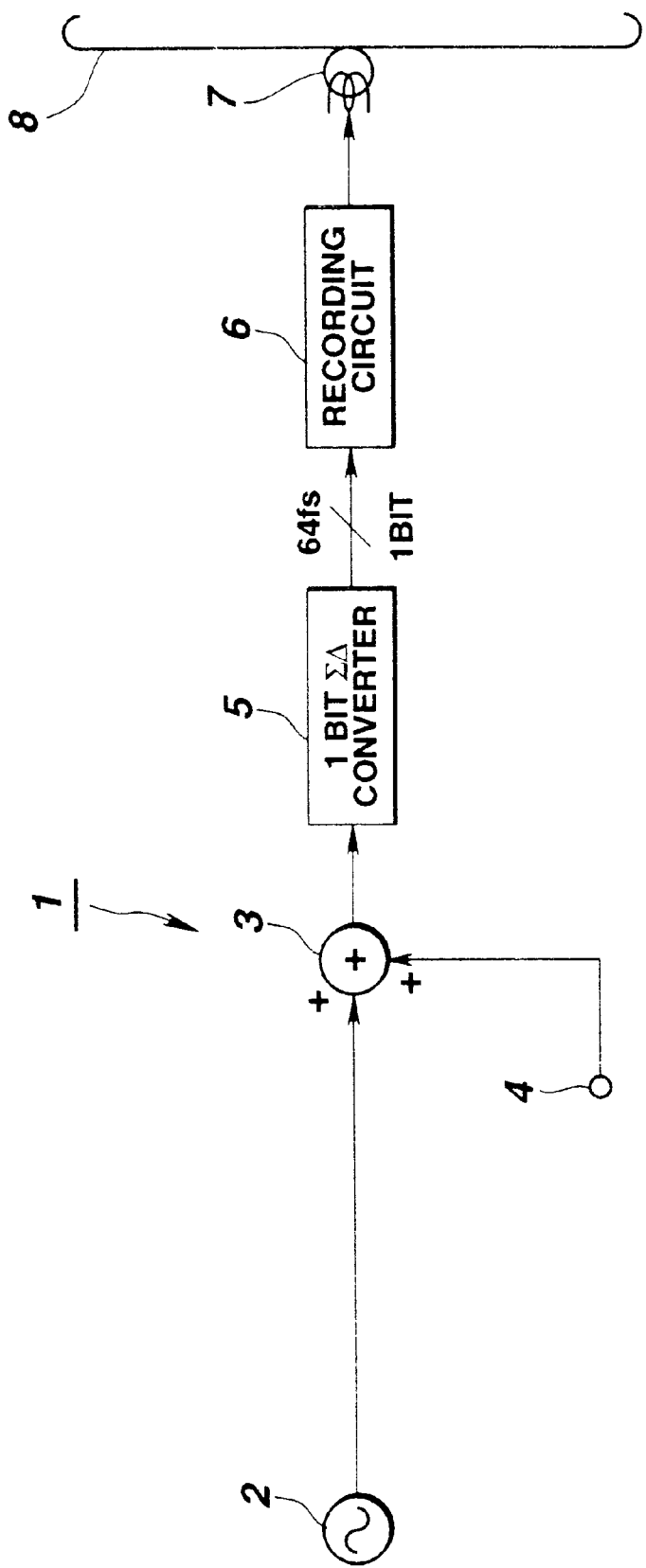
FIG. 1 is a recording apparatus for recording copying inhibiting signals according to a first embodiment of the present invention.

Referring to the drawings, illustrative embodiments of a recording apparatus and a reproducing apparatus of the present invention will be explained in detail.

A first embodiment of the present invention, directed to an audio data recording device 1 for converting analog audio signals by ΣΔ modulation to 1-bit digital audio data, which is recorded on a magnetic tape, is now explained.

The present audio data recording device 1 includes an adder 3 for summing an analog audio signal of an audible range output by a sound source 2 and a copy protection signal 4 modulated with a specified frequency of a band sufficiently separated from the audible range, such as a band of 16 44.1 kHz, and a 1-bit ΣΔ modulator 5 for converting the sum output of the adder 3 to a 1-bit digital data. The present audio data recording device 1 also includes a recording processing circuit 6 for performing recording processing on the 1-bit digital data output by the 1-bit ΣΔ modulator 5.

Usually, the 1-bit ΣΔ modulator 5 samples the analog audio signals with a sampling frequency significantly higher than the frequency range of the analog audio signals (audible frequency range) and quantizes the signals into 1-bit data. In the present embodiment, the analog audio signals are sampled with a sampling frequency 64 times as high as the sampling frequency fs for CD (fs=44.1 kHz), or 64 fs.

Figure 2:
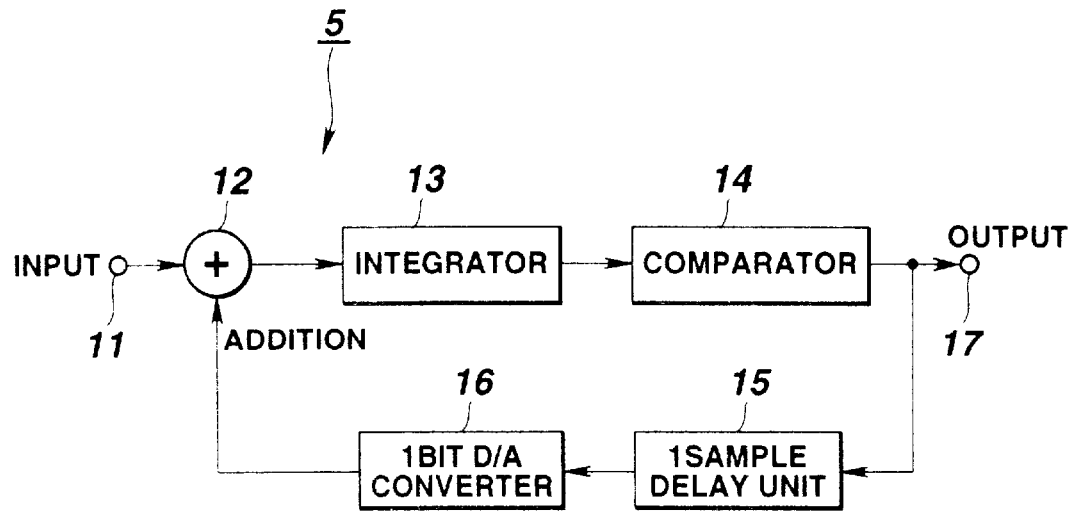
FIG. 2 is a block diagram showing a ΣΔ modulator.

This 1-bit ΣΔ modulator 5 is configured as shown in FIG. 2 in which an analog input signal entering an input terminal 11 is routed via an adder 12 to an integrator 13. An integrated output of the integrator 13 is routed to a comparator 14 for comparison to a neutral point potential of the input signal for 1-bit quantization every sampling period for being output as 1-bit digital audio data.

The 1-bit digital audio data, as the quantized data, is supplied to a one-sample delay unit 15 for being delayed by one sampling period. This delayed data is converted by a digital/analog (D/A) converter 16 into analog signals which are summed by the adder 12 to the input signal from the input terminal 11.

Figure 3:
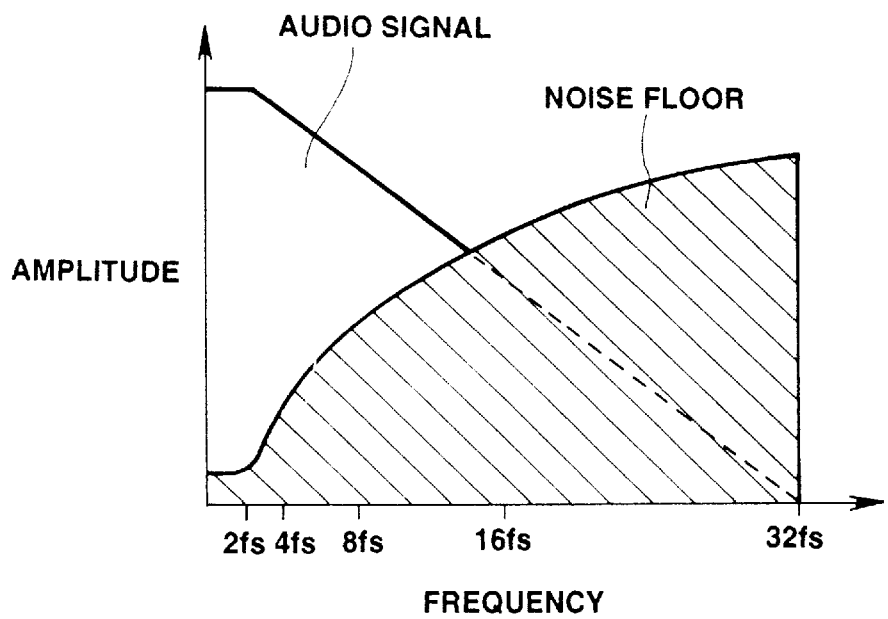
FIG. 3 shows the frequency response of 1-bit audio digital signal modulated by the ΣΔ modulator and the noise component.

FIG. 3 shows, by 'audio signal', the frequency response of the 1-bit digital audio signal output by the 1-bit ΣΔ modulator 5. By ΣΔ conversion by the 1-bit ΣΔ modulator 5, the noise component, shown by 'noise floor', can be shifted to a band higher than the audible range. In the case of the 1-bit digital audio data output by the 1-bit ΣΔ modulator 5, there is left a broad unused band from the vicinity of the frequency of 16 fs up to the Nyquist frequency 32 fs, even though the passband up to 100 kHz is secured and a filter having moderate attenuation characteristics up to the Nyquist frequency of 32 fs is used for prohibiting aliasing, granting that the dynamic range is not so broad, as shown in FIG. 3. This unused range is usually removed by an analog low-pass filter when the data is reproduced after conversion into analog signals by a D/A converter provided on the recording/reproducing apparatus.

The digital audio data recording device 1 of the first embodiment superimposes or adds a copy protection signal having a specified frequency of 16 fs, in a frequency band from the vicinity of 16 fs to the Nyquist frequency of 32 fs, which is a frequency band not affecting the 1-bit digital data. The digital audio data recording device 1 then ΣΔ modulates the addition output by the ΣΔ modulator 5. The 1-bit digital data from the 1-bit ΣΔ modulator 5 is recording-processed by the recording processing circuit 6 (recording circuit) so as to be then recorded as 1-bit digital data by a recording head 7 on a magnetic tape 8.

The above-mentioned copy protection signal is used for prohibiting unauthorized copying of audio data recorded or transmitted simultaneously. In this case, the copying protection signal, supplied from the input terminal 4, is a sine wave of a high frequency of 16 times as high as the sampling frequency (fs =44.1 kHz) of the current compact disc (CD) or 16×44.1 kHz.

Figure 4:
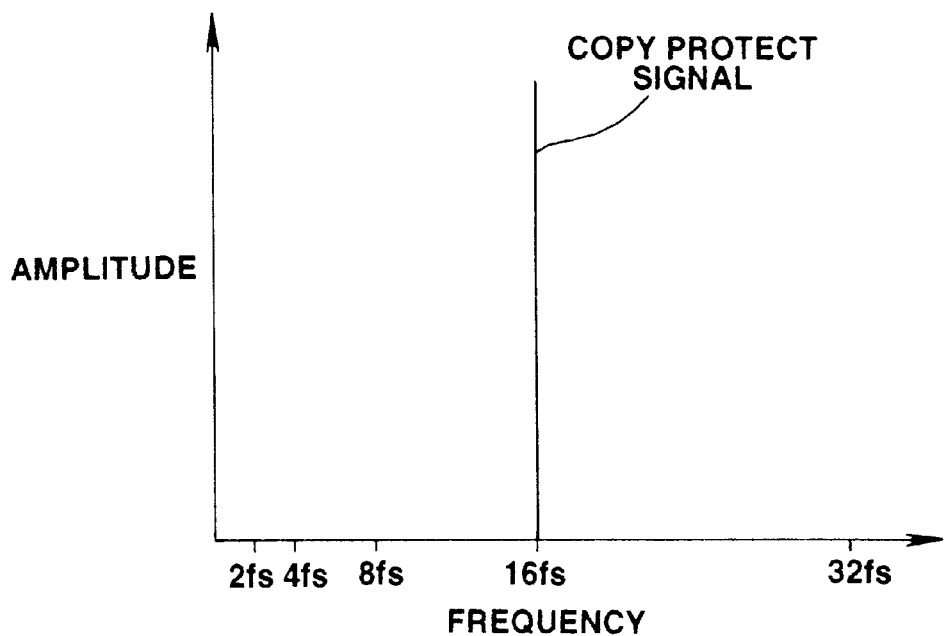
FIG. 4 shows spectral characteristics of a copying inhibition signal according to the present invention.
Figure 5:
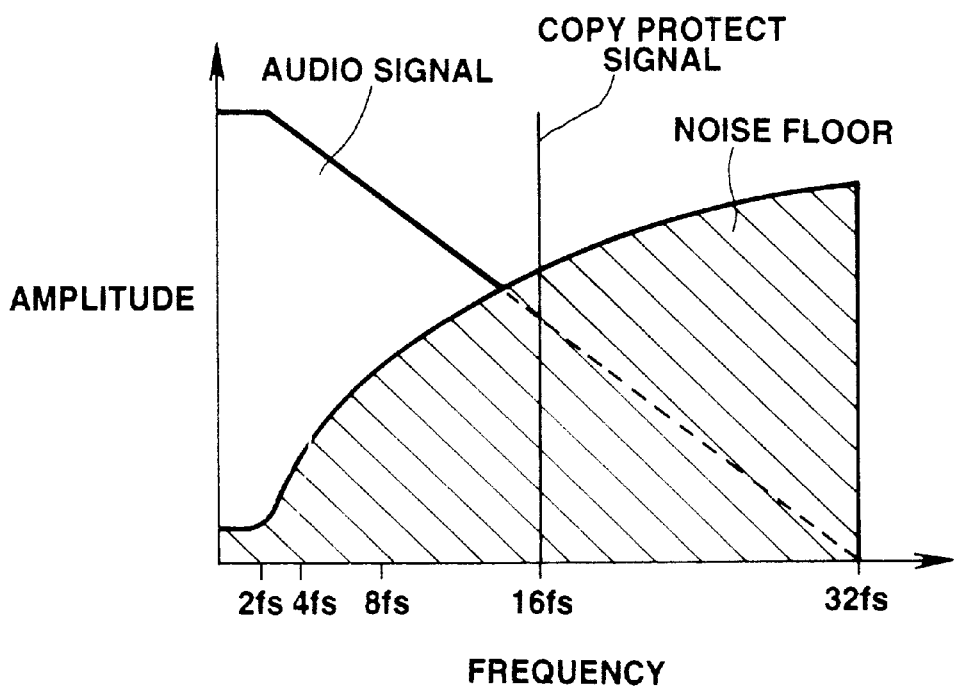
FIG. 5 shows spectral characteristics of a 1-bit audio digital signal, copying protection signal and a noise component modulated by the ΣΔ modulator.

The spectrum of the copy protection signal 'copy protect signal' is as shown in FIG. 4. The spectrum of the 1-bit digital audio signal, on which is superposed the copy protection signal, is as shown in FIG. 5. This copy protection signal is in a frequency range which is higher than the range of 1-bit digital audio data, specified 'audio data' masked by the noise floor, and which is removed by an analog low-pass filter during reproduction, as shown in FIG. 5.

Thus, with the present audio data recording device 1, the copying protection signal can be superimposed on the main audio data for prohibiting unauthorized releasing of the copy protection function on the reproducing side. In addition, since the frequency range not affecting the audio range is used as a range of superposition of the copy protection signal, there is no adverse effect on the main audio data.

Figure 6:
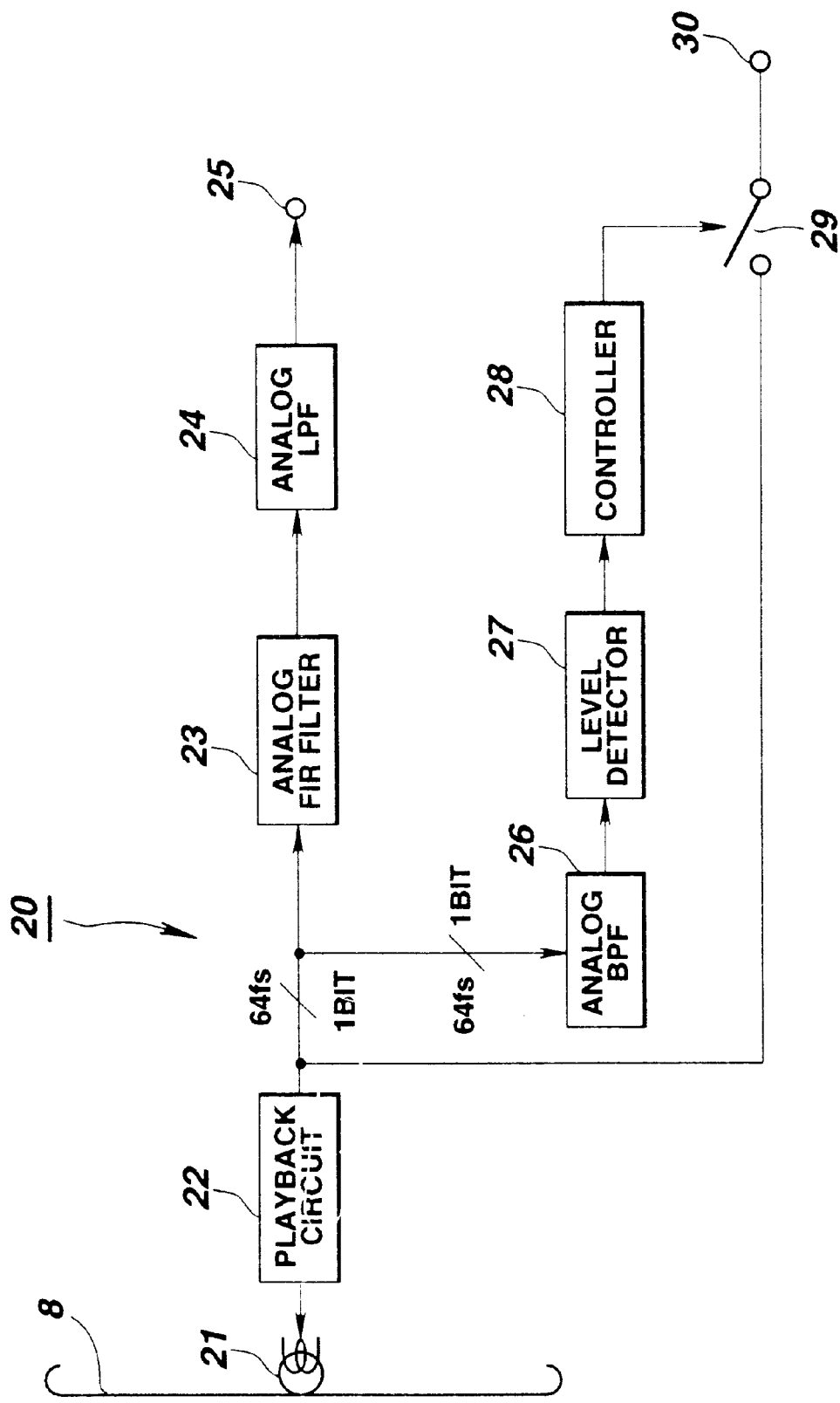
FIG. 6 shows a reproducing apparatus for controlling a digital output using a copying inhibiting signal recorded on the recording medium by the recording apparatus of the first embodiment of the present invention.

A second embodiment of the present invention, directed to an audio data reproducing apparatus for reproducing 1-bit digital data recorded by the audio data recording device 1 of the first embodiment on the magnetic tape 8, is shown in FIG. 6.

The present audio data reproducing apparatus 20 includes a reproducing processing circuit 22 for performing reproducing processing on the above 1-bit digital data taken out by the playback head 21 and a 4-tap analog FIR filter 23 for D/A converting the 1-bit digital data from the reproducing processing circuit 22 as the frequency of the sine wave of 16 fs superposed as the copying protection signal attenuated sufficiently. The audio data reproducing apparatus 20 also includes an analog low-pass filter 24 for generating analog audio signal from a filtered output of the analog FIR filter 23 and a band-pass filter (BPF) 26 for passing the copy protecting signal from the 1-bit digital data. The audio data reproducing apparatus 20 also includes a level detector 27 for comparing the level of the filter output of the BPF 26 to a pre-set reference level for detecting the possible presence of the copy protection signal, and a controller 28 for turning off a switch 29 for inhibiting outputting of the 1-bit digital data from the reproducing processing circuit 22 at an output terminal 30.

Figure 7:
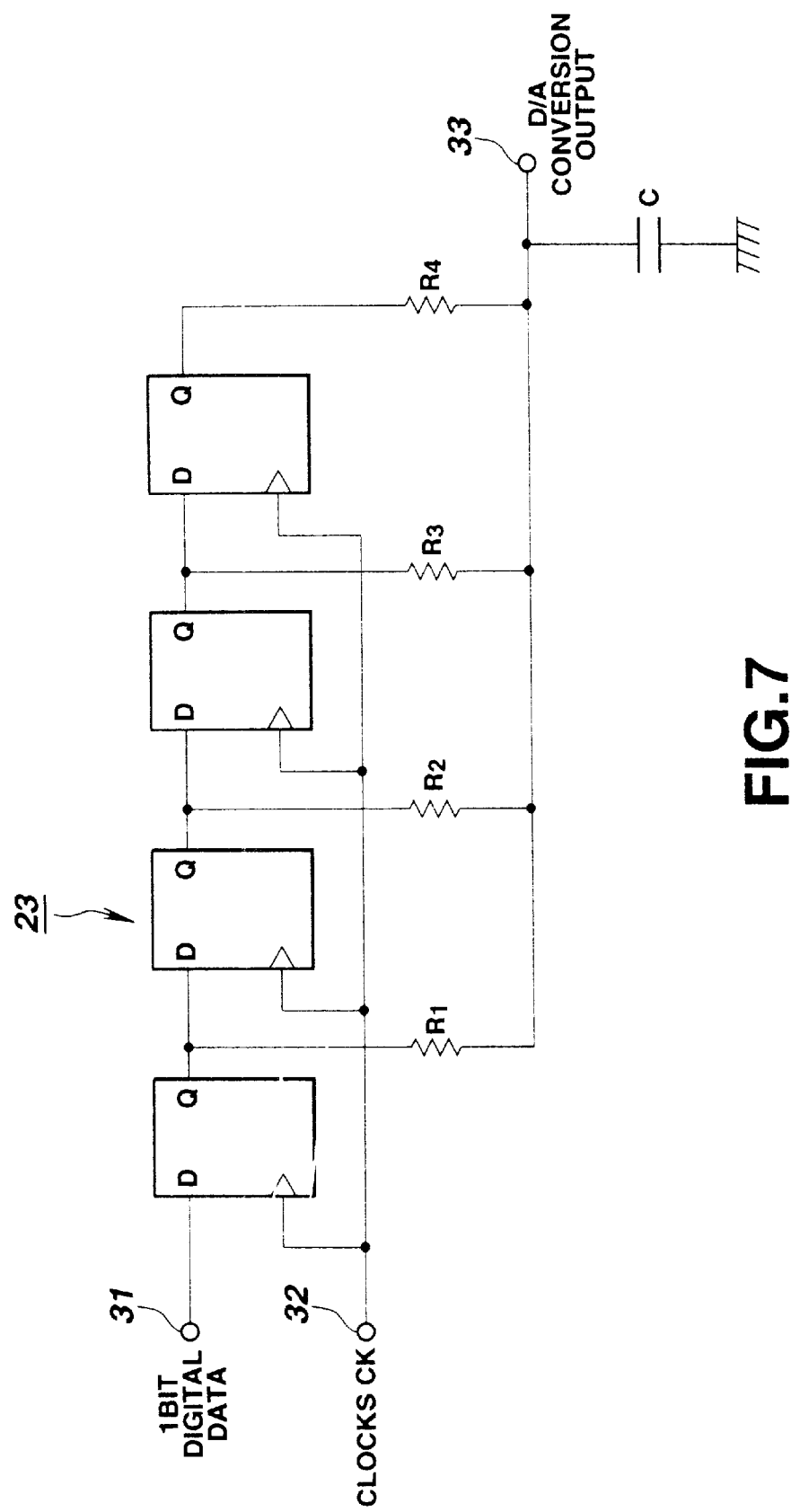
FIG. 7 is a block diagram of an analog FIR filter adapted for use on the reproducing apparatus shown in FIG. 6.

The analog FIR filter 23 includes four cascade-connected D-flipflops f1, f2, f3 and f4 and four resistors R1, R2, R3 and R4 connected to these D-flipflops f1, f2, f3 and f4, as shown in FIG. 7. The currents from the four resistors R1, R2, R3 and R4 are summed for forming an analog FIR filter an output of which is smoothed by the capacitor C so as to be output at an output terminal 33.

An input terminal 31, fed with the 1-bit digital data, is connected to a data input terminal D of the D-flipflop f1, an output terminal Q of which is connected to an input terminal D of the D-flipflop f2. The D-flipflop f2 has an output Q connected to a data input terminal D of the D-flipflop f3, an output terminal Q of which is connected to a data input terminal D of the D-flipflop f4.

A clock input terminal 32, fed with the clocks CK, is connected to clock terminals of the D-flipflops f1, f2, f3 and f4.

The resistor R1 has its one end connected to an output terminal Q of the D-flipflop f1, while the resistor R2 has its one end connected to an output terminal Q of the D-flipflop f2. Similarly, the resistor R3 has its one end connected to an output terminal Q of the D-flipflop f3, while the resistor R4 has its one end connected to an output terminal Q of the D-flipflop f4.

The resistors R1 to R4 have their opposite ends connected together to form a junction from which is formed an output terminal 33. A capacitor C inserted between the junction and the ground is used for smoothing the analog output.

Since the analog filter 23 smooths the output to produce an analog signal, the copy protection signal can be removed in the course of the digital to analog conversion.

The analog signal from the analog FIR filter 23 is passed through the analog LPF 24 and thereby converted to an analog audio signal which is output at an output terminal 25.

On the other hand, the BPF 26 passes the narrow band, centered about the frequency of the sine wave of 16 fs, superposed as the copy protection signal, from the 1-bit digital data. In the level detector 27, the filter output level of the BPF 26 is compared to a pre-set reference level. If the filter output level of the BPF 26 is found to be not less than the pre-set reference level, the changeover switch 29 is turned on by the controller 28 to inhibit outputting of the 1-bit digital data from the output terminal 30. If the filter output level of the BPF 26 is less than the pre-set reference level, the changeover switch 29 is turned off by the controller 28 to permit outputting of the 1-bit digital data from the output terminal 30.

Figure 8:
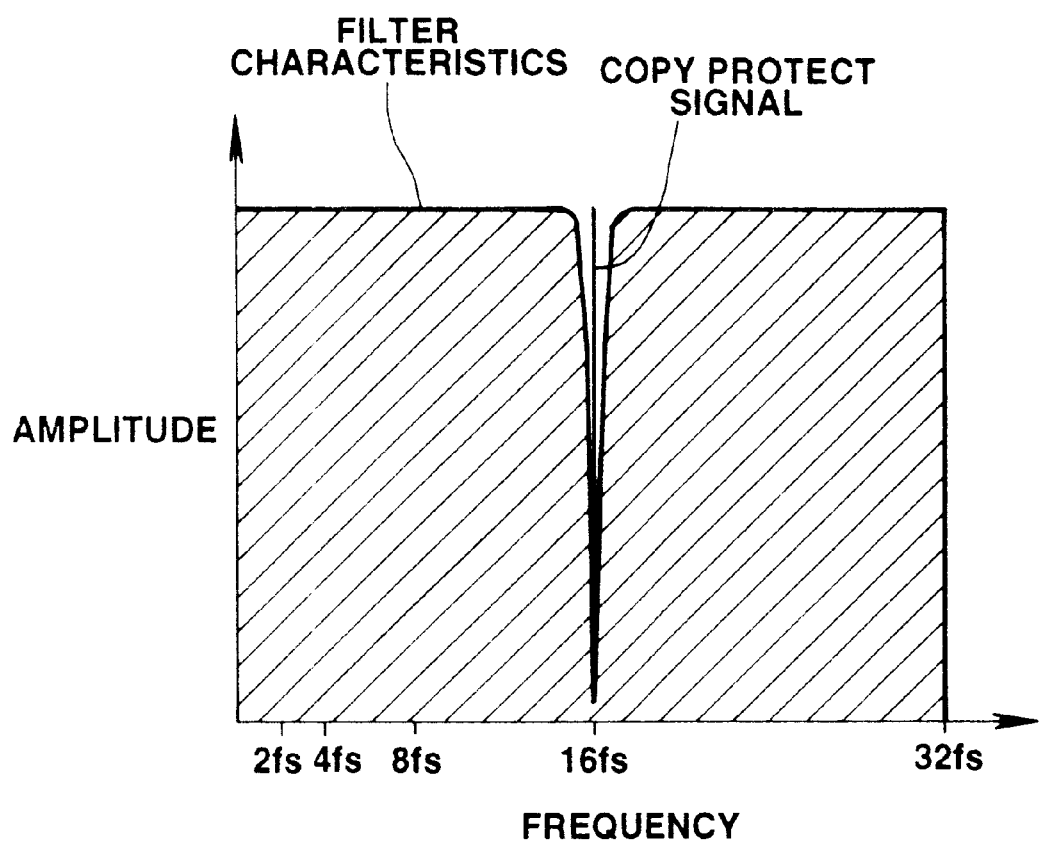
FIG. 8 shows the frequency response of a notch filter used when the user removes the copying inhibiting signal on purpose.

If the user intends to make unauthorized copying and passes the 1-bit digital data from the playback processing circuit 22 through a digital notch filter having the frequency response having 16 fs in a crevice as shown in FIG. 8 in order to take out the 1-bit digital audio data, the copying protection signal can be removed. However, by this processing, output data becomes a multi-bit signal. Therefore, the original 1-bit digital audio data cannot be taken out while the copying protection function is released. That is, if the copying protection signal is removed by the above digital notch filter having the frequency of 16 fs as the crevice, a multiple bit signal is output in a form in which the surrounding band centered about the frequency of 16 fs has also been removed, such that a multi-bit digital signal is output at the output terminal instead of a 1-bit digital signal.

If digital copying is performed, it is desirable to record the 1-bit digital signal itself on a recording medium from another recording medium on which the 1-bit digital signal itself has been recorded. However, if the copy protection is annulled as described above, the 1-bit digital is converted by the digital notch filter into a multi-bit signal, so that the 1-bit signal itself cannot be recorded on the recording medium. That is, the dubbing which takes advantage of the high quality and high band characteristic of the 1-bit digital signal is inhibited.

Thus, with the present digital data reproducing apparatus 20, the 1-bit digital audio data, as the main data, is converted into multi-bit data, in the face of an attempt of illicitly releasing the copying protection function, thus enabling the original data to be protected for most efficiently manifesting the copy protection function.

Figure 9:
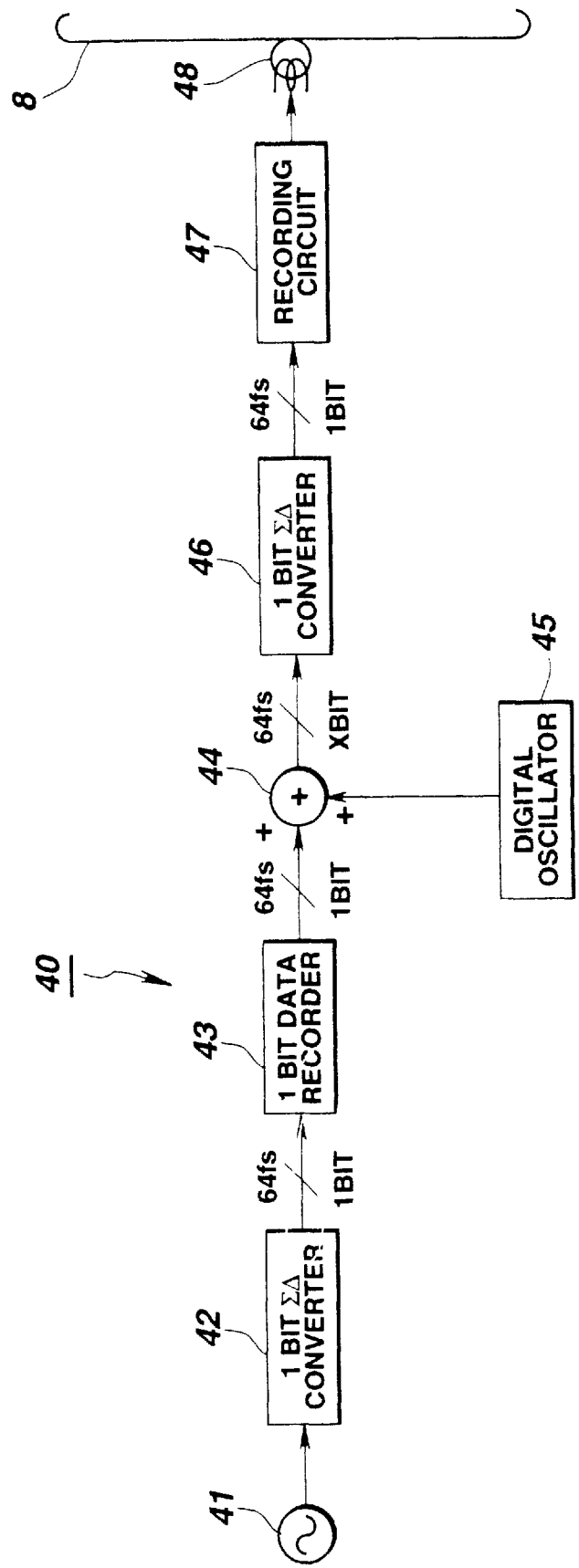
FIG. 9 shows a recording apparatus for recording a copying inhibiting signal according to a second embodiment of the present invention.

A third embodiment of the present invention, directed to an audio data recording device 40 for converting the analog audio signal by recording analog audio signals by $\Sigma\Delta$ modulation into 1-bit digital data for recording on the magnetic tape 8, is shown in FIG. 9.

The present audio data recording device 40 differs from the audio data recording device 1 of the first embodiment in that, in the audio data recording device 1, the copy protection signal is summed to the analog audio signal and subsequently the sum output is converted by 1-bit $\Sigma\Delta$ conversion, whereas, in the audio data recording device 40, a copying protection signal of a sine wave is summed to the 1-bit digital audio data converted from an analog audio signal by $\Sigma\Delta$ modulation and the resulting sum signal is further modulated by 1-bit $\Sigma\Delta$ modulation.

The audio data recording device 40 includes a 1-bit $\Sigma\Delta$ modulator 42 for converting the analog audio signal from a sound source 41 into 1-bit digital audio data and a 1-bit data recorder 43 for temporarily storing the 1-bit digital audio data from the 1-bit $\Sigma\Delta$ modulator 42. The audio data recording device 40 also includes a digital oscillator 45 for producing a digital sine wave of 16 fs used as copying protection signal and a digital adder 44 for summing the digital copying protection signal to the 1-bit digital audio data from the 1-bit data recorder 43. The audio data recording device 40 further includes a 1-bit $\Sigma\Delta$ modulator 46 for re-modulating the sum output from the digital adder 44 to 1-bit digital data and a recording processing circuit 47 for recording processing the 1-bit digital data from this 1-bit $\Sigma\Delta$ modulator 46.

The analog audio signals from the sound source 41 are $\Sigma\Delta$ converted by the 1-bit $\Sigma\Delta$ modulator 42 with the sampling frequency 64 times as high as the sampling frequency fs (=44.1 kHz) for the CD or 64 fs. The 1-bit digital audio data from the 1-bit $\Sigma\Delta$ modulator 42 is temporarily stored in the 1-bit data recorder 43 and thence supplied to the digital adder 44.

The digital adder 44 sums the 1-bit digital audio data from the 1-bit data recorder 43 to the multi-bit copying protection signal from the digital oscillator 45. The sum output from the digital adder 44 (64 fs/multi-bit output) is modulated by the 1-bit $\Sigma\Delta$ modulator 46 into 1-bit digital data which is supplied to the recording processing circuit 47. The 1-bit digital data, recording-processed by the recording processing circuit 47, is recorded by the recording head 48 on the magnetic tape 8.

With the present audio data recording device 40, the copying protection signal can be recorded in superposition in a band sufficiently separated from the band of the 1-bit digital audio data.

Thus, with the present audio data recording device 40, the copying protection signal can similarly be superposed on the main data prohibiting illicit copying protection function releasing operation on the reproducing side. In addition, since the copy protection signal is superposed in a frequency area which does not affect the audio area, the main audio data can be prevented from being deteriorated in sound quality.

The present invention is not limited to specified structures of the signal processing apparatus, signal recording device or the signal reproducing device. For example, the recording device may be replaced by a transmission apparatus transmitting one-bit digital data. In this case, the circuit structure for the former half of the signal processing circuit may be used in common. The reproducing device may similarly be replaced by the reception device.

It is to be noted that the signal processing device according to the present invention represents a portion that may be used in common by the recording device and the transmission device or by the reproducing device and the reception device.

What is claimed is:

1. A reproducing apparatus for reproducing a recording medium having recorded thereon, as a $\Sigma\Delta$ modulated 1-bit digital signal, an audio signal having a first band containing an audible range and a copying protection signal having a pre-set frequency in a second band separated from said first band and outside of the audible range of the audio signal, comprising:

reproducing means for reproducing the 1-bit digital signal containing said audio signal and said copying protection signal from said recording medium;

output means for outputting the 1-bit digital signal reproduced by said reproducing means;

first extraction means for extracting the audio signal having the first band from the 1-bit digital signal reproduced by said reproducing means;

second extraction means for extracting the copying protection signal contained in the second band from the 1-bit digital signal reproduced by said reproducing means; and control means for inhibiting outputting of the 1-bit digital signal from said output means based on a presence of the copying protection signal extracted by said second extraction means, wherein said second extraction means includes:

filtering means for extracting the copying protection signal having the pre-set frequency contained in said second band from the 1-bit digital signal; and comparator means for comparing a level of the copying protection signal extracted by said filtering means to a reference level, wherein when said comparator means finds that the level of the copying protection signal extracted by said filtering means is larger than said reference level said control means inhibits outputting of the 1-bit digital signal.

2. The reproducing apparatus for reproducing a recording medium having recorded thereon, as a $\Sigma\Delta$ modulated 1-bit digital signal, an audio signal having a first band containing an audible range and a copying protection signal having a pre-set frequency in a second band separated from said first band and outside of the audible range of the audio signal, as claimed in claim 1, wherein the $\Sigma\Delta$ modulated 1-bit signal was recorded by:

addition means for summing said audio signal and said copying protection signal;

$\Sigma\Delta$ modulation means for converting an addition output of said addition means into a 1-bit digital signal; and recording means for recording said 1-bit digital signal containing said audio signal and said copying protection signal on the recording medium.

3. The reproducing apparatus for reproducing a recording medium having recorded thereon, as a $\Sigma\Delta$ modulated 1-bit digital signal, an audio signal having a first band containing an audible range and a copying protection signal having a pre-set frequency in a second band separated from said first band and outside of the audible range of the audio signal as claimed in claim 2 further comprising:

second $\Sigma\Delta$ modulation means for converting said main signal into a 1-bit digital signal; and a digital oscillator for generating said copying protection signal having said pre-set frequency contained in said second band separated from said first band.

\* \* \* \* \*